(12) United States Patent
Maria Saguer et al.

(10) Patent No.: US 9,438,770 B2
(45) Date of Patent: Sep. 6, 2016

(54) COLOR IMAGE CONVERSION USING CHROMA

(75) Inventors: Marti Maria Saguer, Palamos (ES); Laura Alicia Clemente Gomez, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 12 days.

(21) Appl. No.: 14/408,973

(22) PCT Filed: Jul. 24, 2012

(86) PCT No.: PCT/EP2012/064536
§ 371 (c)(1),
(2), (4) Date: Apr. 14, 2015

(87) PCT Pub. No.: WO2014/015898
PCT Pub. Date: Jan. 30, 2014

(65) Prior Publication Data
US 2015/0237234 A1    Aug. 20, 2015

(51) Int. Cl.
*G06K 9/00*        (2006.01)
*H04N 1/60*        (2006.01)

(52) U.S. Cl.
CPC ................................. *H04N 1/6016* (2013.01)

(58) Field of Classification Search
CPC .. H04N 1/6016; H04N 1/6058; H04N 9/045; G06T 11/001; G06T 7/408; G06T 5/001
See application file for complete search history.

(56) References Cited

U.S. PATENT DOCUMENTS

| | | | | |
|---|---|---|---|---|
| 5,216,498 A * | 6/1993 | Matsunawa | ............... | H04N 1/38 358/500 |
| 5,742,410 A * | 4/1998 | Suzuki | ..................... | H04N 1/58 358/448 |
| 6,124,897 A * | 9/2000 | Nguyen | ................... | H04N 9/75 348/180 |
| 6,559,976 B1 * | 5/2003 | Hirota | .................. | H04N 1/6072 358/2.1 |
| 6,707,951 B1 * | 3/2004 | Suzuki | ............... | H04N 1/40062 382/260 |
| 6,816,613 B2 * | 11/2004 | Tohyama | .............. | G06T 7/0081 382/164 |
| 7,236,641 B2 | 6/2007 | Curry et al. | | |
| 7,529,006 B2 * | 5/2009 | Itagaki | ............... | G03G 15/5041 358/1.9 |
| 2001/0012399 A1 * | 8/2001 | Tohyama | .............. | G06T 7/0081 382/167 |
| 2005/0207641 A1 | 9/2005 | Bala et al. | | |
| 2007/0046957 A1 | 3/2007 | Jacobs et al. | | |
| 2007/0236737 A1 | 10/2007 | Pellar | | |
| 2008/0094517 A1 | 4/2008 | Takeuchi et al. | | |
| 2008/0187244 A1 | 8/2008 | Shoda | | |
| 2008/0218801 A1 | 9/2008 | Li | | |
| 2011/0149308 A1 | 6/2011 | Hinds et al. | | |
| 2015/0237234 A1 * | 8/2015 | Saguer | ................. | H04N 1/6016 382/162 |

OTHER PUBLICATIONS

Amy A. Gooch, Sven C. Olsen, Jack Tumblin, Bruce Gooch: "Color2Gray: salience-preserving color removal", Journalacm Transactions on Graphics (TOG)—Proceedings of ACM SIG-GRAPH 2005 TOG Homepage, vol. 24, No. 3, Jul. 31, 2005 pp. 634-639. XP040023271 New York, USA.
C. Rodgers; Split a PDF Into Separate Files Containing Colour and B&W Pages; Feb. 20, 2007; http://rodgers.org.uk/archives/16.
PDF Page Color Split for Acrobat; http://www.traction-software.co.uk/pdfpagecolorsplit/index.htm.

* cited by examiner

*Primary Examiner* — Amir Alavi
(74) *Attorney, Agent, or Firm* — HP Inc. Patent Department

(57) ABSTRACT

In one example, a color image is converted to a gray image and/or a black and white image. The amount of chroma in an input image is detected and conversion to gray and/or black and white of the input image is computed simultaneously.

13 Claims, 1 Drawing Sheet

COLOR IMAGE CONVERSION USING CHROMA

CROSS-REFERENCE TO RELATED APPLICATION

This application is a U.S. National Stage Application of and claims priority to International Patent Application No. PCT/EP2012/064536, filed on Jul. 24, 2012, and entitled "COLOR IMAGE CONVERSION," which is hereby incorporated by reference in its entirety.

BACKGROUND TO THE INVENTION

When a multipage job has only some pages in color, printing the entire job across the color pipeline implies additional costs that, in volume, may be significant. One known solution to minimize those costs are to send only the pages that contain color elements across the color pipeline and use the black and white path for the rest. However, this requires detecting in advance which pages can be printed using black ink only.

Unfortunately, detection of which pages can be printed by a black ink is not trivial. Elements in the image to be printed, e.g. elements within the PDF document, can be stored in a multitude of color models and color spaces. Gray elements in an image, for example contained within a PDF document, can be encoded in a multitude of ways, depending on the color model they use.

BRIEF DESCRIPTION OF DRAWINGS

For a more complete understanding, reference is now made to the following description taken in conjunction with the accompanying drawings in which.

DETAILED DESCRIPTION

Gray elements in an image can be encoded in many different ways depending on the color model used. CMYK, for example, may use K ink only to encode gray, but in some CMYK space, equal values of CMY may also result in rendering gray as well, depending on color space. Finally, International Color Consortium (ICC) Based elements can be stored in any color space, as long as they include an input ICC profile to define the mappings between the color space and a profile connection space, e.g. L*a*b. For those elements, as well as PDF holding extra PANTONE planes, it is difficult to determine the amount of chroma in an image without converting each pixel using interpolation which is very processing intensive and hence separate pages of a multipage job for a color path or a black and white path for printing.

It is not safe to evaluate reduced renderings of the final document, as small elements containing color would be discarded when reducing the image. This is indeed a quite frequent case on some marketing plots, where only small portions of the plot do contain color to enforce the promotional message. Keeping those small portions in color is extremely important in this case.

One option is a manual approach, where a human operator inspects and separates the documents by hand. Obviously this is very time consuming.

Another option would be to render the page to an RGB device space and check for R=G=B parts. This approach may work to some extent, but in general RGB spaces do not require having gray axes located on RGB locus.

Figure 1:
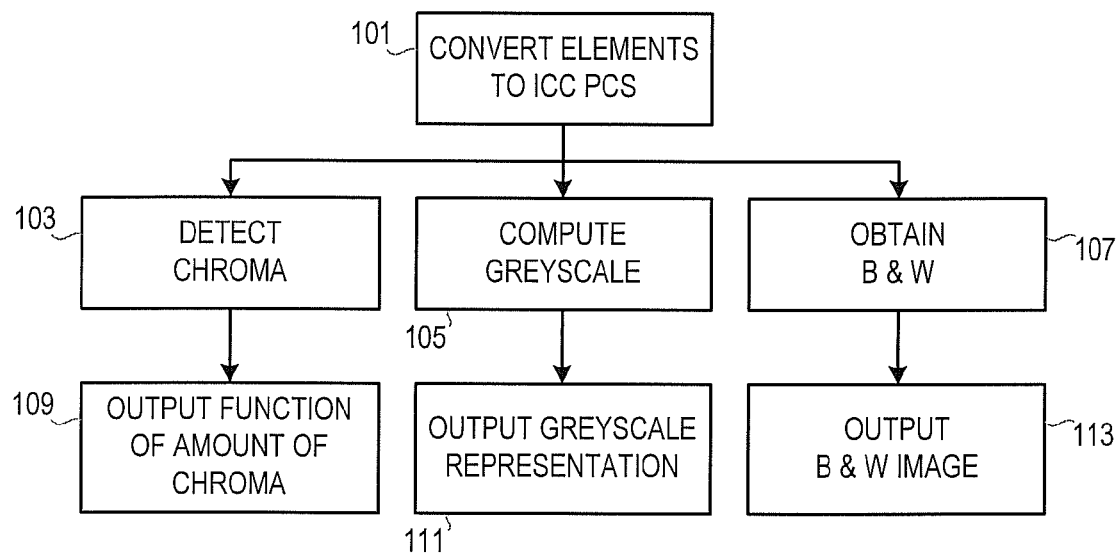
FIG. 1 is a flowchart of an example of a method of converting a color image.

In FIG. 1, a method of converting a color image to a gray image and/or a black and white image is illustrated. The amount of chroma in an input image is detected 103 simultaneously with computing 105, 107 conversion to gray and/or black and white of the input image.

Figure 2:
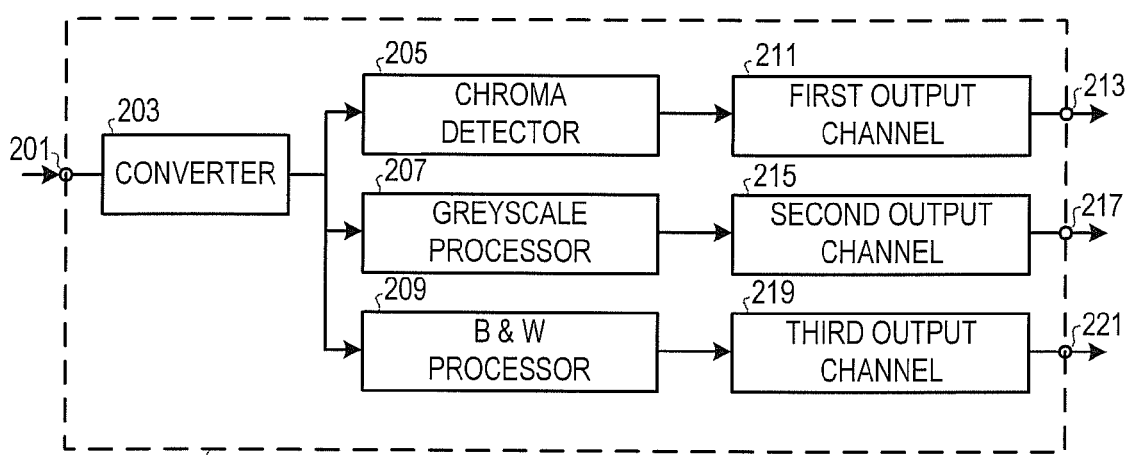
FIG. 2 is a simplified schematic of an example of apparatus for converting color image.

In FIG. 2, apparatus 200 for converting a color image to a gray image and/or a black and white image is illustrated. The apparatus 200 comprises a detector 205 configured to detect the amount of chroma in an input image; and a processor 207, 209 configured to compute conversion to gray and/or black and white of the input image, wherein the detector 205 and processor 207, 209 are in parallel such that detecting the amount of chroma in an input image and computing conversion to gray and/or black and white of the input image are performed simultaneously. The apparatus further comprises an input terminal 201 for input of an image. The input terminal 201 is connected to a converter 203. The converter 203 is connected to the detector 205, a first processor 207 and a second processor 209. The output of the detector is connected to a first output channel 211 which is connected to a first output terminal 213 of the apparatus 200. The output of the first processor 207 is connected to a second output channel 215 which is connected to a second output terminal 217 of the apparatus 200. The output of the second processor 209 is connected to a third output channel 219 which is connected to a third output terminal 221 of the apparatus 200. Although separate detector and processors are illustrated in FIG. 2, it can be appreciated that a single processor having parallel processing paths may be implemented here, wherein each processing path is connected to the respective output channels 211, 215, 219.

The example below is described with respect to an image of a PDF document available for printing. Although PDF documents are specified, it can be appreciated that any form of image may be applicable here such as for example any graphic format capable of containing color images, e.g. TIFF files.

As a result, color pages in a PDF are detected whilst, simultaneously, computing conversion to gray and/or black and white. For a given PDF page neutral gray contained therein is detected in a way that is independent of the color model, the color space and the encoding.

A specialized ICC output profile operating in the L*a*b*→RGB (output) direction and in the media-relative colorimetric intent is used, for example, an ICC profile referred to by ISO 15076-1:2005, "Image technology colour management—Architecture, profile format and data structure", the specialized ICC output profile may be considered to a profile which uses this ICC standard.

A plurality of elements of an input image on the input terminal 201 of the apparatus 200 are converted 191 by the converter 203 into ICC PCS, for example, default device RGB, Gray and CMYK color spaces of the PDF rasterizer should be set to ICC Based spaces, for example standard RGB (sRGB) and Specifications for Web Offset Publications (SWOP). This forces all elements of the PDF to be evaluated across the ICC workflow and therefore all PDF elements are converted to the ICC profile connection space (PCS) which is colorimetric (either XYZ or L*a*b*), 101 by the converter 203 of the apparatus 200.

When used in the PDF workflow, this specialized ICC profile gets PCS colorimetric information in the L*a*b* color space.

The a*b* axis is used by the detector 205 to detect which pixels have chroma, 103. A threshold on how much chroma triggers the notification, that is, a pixel has chroma if the amount of chroma of the pixel is above a predetermined threshold obtaining in this way detection of documents that are not completely gray, but very close. A function of the amount of detected chroma is output, 109, on the first output channel 211, for example, the R output channel. This gives a robust indication of whatever the given image is gray, close-to-gray or otherwise it has color information. In the reference implementation we used 0 for no chroma and a number in 1 . . . 255 range for various small amounts of chroma.

Since this operation takes only one output channel, and the ICC profile has L*a*b* information on the PCS, the L* channel is used to derive 105 a grayscale representation on the image in the first processor 207 on a second output channel 215 and hence second output terminal 217 of the apparatus, channel G. One way that this may be achieved is to copy L* untouched as the gray channel. This works quite well, as L* would behave as a gray channel operating in the 2.4 gamma space. However, it can be appreciated that any more sophisticated approaches may be used.

A step function is also applied to this gray image to obtain a pure black & white rendering, which is very useful on documents containing only black text, for example by simply thresholding the grey channel. This latter is output 113 on the third output channel 219, and the third output terminal 221 of the apparatus, channel B.

This means that by using a single ICC profile, at least 2 different operations may be carried out at the same time and at the same computational cost. In the example above 3 different operations are carried out at the same time, namely, detect the amount of chroma in an image, compute conversion to gray and compute conversion to pure black and white.

This increases throughput, since the detection of gray/color involves the conversion to gray and black and white, any available software used by the print service providers can use the computed gray image if detection of gray succeeds. This fully eliminates the need of conversion to gray.

This method is very robust: a*/b* close to zero means no chroma relative to media white. This approach would work on very unusual situations like use of white ink or colored media. By using ICC relative colorimetric intent, it can be ensured that observer adaptation state is properly handled.

The use of sigmoidal functions on a*/b* axis gives more sensitivity to gray detection, and increases the range where "close to gray" images can be discriminated. This does not affect to gray or b & w conversion since only affects to a*/b* axis, which are not used in the conversions.

The ICC profile gives distribution of chroma in the first output channel 211, channel R. A histogram on this plane can give additional information on the relative usage of color. Plots containing a small colored element, which sometimes is used in ads or in graphic art, are detected and honored. Other approaches for gray detection may fail on such images.

Finally, a preview of the gray conversion can be shown to the user, who in ultimate place has the decision in cases of doubt.

This method obtains also the resulting bitmaps of the conversion to grayscale and pure black and white. At least 2 operations, in the example above all 3 operations are performed simultaneously at the same computational cost. The solution is implemented by using just one output ICC profile, and requires no modifications in existing RGB workflows.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. The features of any dependent claim may be combined with the features of any of the independent claims or other dependent claims.

The invention claimed is:

1. A method of converting a color image to a gray image and/or a black and white image, the method comprising, simultaneously:
   detecting the amount of chroma in an input image;
   computing conversion to gray and/or black and white of the input image; and
   converting a plurality of elements of an input image into International Color Consortium Profile Connection Space (ICC PCS);
   wherein the detection of the amount of chroma in an input image comprises detecting the amount of chroma of each element of the converted image; and
   wherein the computation of the conversion to gray and/or black and white comprises computing conversion to gray and/or black and white of the converted image.

2. A method according to claim 1, wherein the detection of the amount of chroma of each element of the converted image comprises:
   determining which pixel of the converted image has chroma and which has no chroma;
   determining the amount of chroma for each pixel determined as having chroma.

3. A method according to claim 2, wherein the determination of which pixel of the converted image has chroma and which has no chroma comprises:
   using a*/b* axis of the ICC profile of the converted image to determine which pixel of the converted image has chroma and which has no chroma.

4. A method according to claim 3, wherein the method further comprises:
   outputting a function of the amount of chroma on a first output channel.

5. A method according to claim 1, wherein the computation of the conversion to gray of the converted image comprises
   deriving a greyscale representation of the input image.

6. A method according to claim 5, wherein the method further comprises:
   outputting the greyscale representation of the input image on a second output channel.

7. A method according to claim 1, wherein the computation of black and white of the converted image comprises
   applying a step function to the converted image; and
   obtaining a pure black and white rendering of the applied, converted image.

8. A method according to claim 7, wherein the method further comprises:
   outputting the pure black and white rendering of the input image on a third output channel.

9. An apparatus for converting a color image to a gray image and/or a black and white image, the apparatus comprising a detector configured to detect the amount of chroma in an input image;

a processor configured to compute conversion to gray and/or black and white of the input image, and a first output channel configured to output a function of the amount of chroma;

wherein the detector and processor are in parallel such that detecting the amount of chroma in an input image and computing conversion to gray and/or black and white of the input image are performed simultaneously; and wherein the apparatus further comprises a third output channel configured to output the pure black and white rendering of the input image, wherein the third output channel is parallel with respect to the first output channel.

10. The apparatus according to claim 9, wherein the apparatus further comprises a converter configured to convert a plurality of elements of an input image into International Color Consortium Profile Connection Space (ICC PCS); and wherein the output of the converted is in communication with the input of the detector and processor.

11. The apparatus according to 9, wherein the apparatus further comprises a second output channel configured to output the greyscale representation of the input image, wherein the second output channel is parallel with respect to the first output channel.

12. The apparatus according to 11, wherein the apparatus further comprises a third output channel configured to output the pure black and white rendering of the input image, wherein the third output channel is parallel with respect to the first and second output channels.

13. An apparatus for converting a color image to a gray image and/or a black and white image, the apparatus comprising:

a detector configured to detect the amount of chroma in an input image;

a processor configured to compute conversion to gray and/or black and white of the input image, and a converter configured to convert a plurality of elements of an input image into International Color Consortium Profile Connection Space (ICC PCS);

wherein the detector and processor are in parallel such that the detection of the amount of chroma in an input image and the computing conversion to gray and/or black and white of the input image are performed simultaneously;

wherein the detection of the amount of chroma in an input image comprises detecting the amount of chroma of each element of the converted image; and wherein the computation of the conversion to gray and/or black and white comprises computing conversion to gray and/or black and white of the converted image.

* * * * *

UNITED STATES PATENT AND TRADEMARK OFFICE
CERTIFICATE OF CORRECTION

| | | |
|---|---|---|
| PATENT NO. | : 9,438,770 B2 | Page 1 of 1 |
| APPLICATION NO. | : 14/408973 | |
| DATED | : September 6, 2016 | |
| INVENTOR(S) | : Marti Saguer et al. | |

It is certified that error appears in the above-identified patent and that said Letters Patent is hereby corrected as shown below:

In the Claims

Column 5, Line 24, Claim 11, delete "to" and insert -- to claim --, therefor.

Column 6, Line 1, Claim 12, delete "to" and insert -- to claim --, therefor.

Signed and Sealed this
Seventh Day of February, 2017

Michelle K. Lee
*Director of the United States Patent and Trademark Office*